US007515915B2

(12) United States Patent
Buckley

(10) Patent No.: US 7,515,915 B2
(45) Date of Patent: Apr. 7, 2009

(54) APPARATUS, AND ASSOCIATED METHOD, FOR BROADCASTING SHORT CODES FOR USE IN DIRECTING A CALL TO A SERVICE CENTER DURING OPERATION OF A MOBILE COMMUNICATION SYSTEM

(75) Inventor: Adrian Buckley, Brentwood, CA (US)

(73) Assignee: Research In Motion Limited, Waterloo (CA)

( * ) Notice: Subject to any disclaimer, the term of this patent is extended or adjusted under 35 U.S.C. 154(b) by 679 days.

(21) Appl. No.: 10/772,024

(22) Filed: Feb. 4, 2004

(65) Prior Publication Data
US 2005/0003803 A1   Jan. 6, 2005

(30) Foreign Application Priority Data
Feb. 6, 2003   (WO) .................... PCT/CA03/00161

(51) Int. Cl.
*H04Q 7/20*   (2006.01)
(52) U.S. Cl. ................. 455/456.1; 455/404.1; 455/521; 455/432.1; 379/37
(58) Field of Classification Search ............. 455/414.1, 455/404.1, 466, 515, 422.1, 561, 521, 456.1, 455/452, 432.1, 517, 507; 379/37, 45, 46
See application file for complete search history.

(56) References Cited
U.S. PATENT DOCUMENTS

| 5,226,075 | A | * | 7/1993 | Funk et al. | .................. 379/243 |
|---|---|---|---|---|---|
| 5,946,618 | A | * | 8/1999 | Agre et al. | ................... 455/428 |
| 6,115,596 | A | * | 9/2000 | Raith et al. | .............. 455/404.2 |
| 6,181,930 | B1 | * | 1/2001 | Lee | .......................... 455/426.1 |
| 6,345,095 | B1 | | 2/2002 | Yamartino | ............. 379/355.08 |
| 6,374,103 | B1 | * | 4/2002 | Kamel et al. | ................. 455/426 |
| 6,519,466 | B2 | * | 2/2003 | Pande et al. | .............. 455/456.1 |
| 6,625,457 | B1 | * | 9/2003 | Raith | ...................... 455/456.1 |
| 6,680,998 | B1 | * | 1/2004 | Bell et al. | ...................... 379/37 |
| 6,795,706 | B1 | * | 9/2004 | Cheng | ........................ 455/436 |

FOREIGN PATENT DOCUMENTS

| DE | 200 22 891 | 7/2002 |
|---|---|---|
| EP | 1 001 590 A2 | 5/2000 |
| GB | 2 330 033 | 4/1999 |
| WO | WO 00/41421 | 7/2000 |
| WO | WO 01/13670 A1 | 2/2001 |
| WO | WO 02/19748 A1 | 3/2002 |

* cited by examiner

*Primary Examiner*—Sujatha Sharma

(57) ABSTRACT

Apparatus (58), and an associated method, for facilitating delivery of network-specific dialing codes to a mobile node (12). Broadcasts of the network-specific dialing codes are scheduled by a broadcast scheduler 64 embodied at a cell broadcast center (38). Signals containing the codes are broadcast and detected by the mobile node (12), thereby to download the values to the mobile node. And, the downloaded dialing codes are indexed (88) together with the dialing codes normally used by the mobile node (12) to call the corresponding service centers (44). Subsequently, when a call is placed to a service center, the dialing codes are transposed (94), if necessary, to permit the call to a designated service center (44) to be completed.

16 Claims, 4 Drawing Sheets

APPARATUS, AND ASSOCIATED METHOD, FOR BROADCASTING SHORT CODES FOR USE IN DIRECTING A CALL TO A SERVICE CENTER DURING OPERATION OF A MOBILE COMMUNICATION SYSTEM

CROSS REFERENCE TO RELATED APPLICATION

This application claims the benefit of International Application No. PCT/CA03/00161, filed on Feb. 6, 2003, the entire disclosure of which is incorporated herein by reference.

The present invention relates generally to a manner by which to facilitate call placement by a user of a mobile node to a service center, such as an emergency dispatch center or a directory-service center, identifiable by a user by a short dialing code, such as a 9-1-1 or 9-9-9 dialing code. More particularly, the present invention relates to apparatus, and an associated method, by which to broadcast, or otherwise deliver, short codes, used in a network with which the mobile node is registered, to the mobile node. Once delivered to the mobile node, the delivered short dialing codes are associated with short dialing codes normally used by the user to identify the service center.

A user is able to contact the service center by entering the short dialing codes that the user associates with the service center, irrespective from where the call is placed. If the short dialing code entered by the user differs with the short dialing code used in the geographical area at which the call is placed, the entered dialing code is transposed, and the call is placed using the appropriate short dialing code. The user of the mobile node need not learn the short dialing code used throughout different geographical areas.

BACKGROUND OF THE INVENTION

Communication of data between spaced-apart locations is a necessary aspect of modern society. Communication of data is required to effectuate many varied functions and services. And, many varied types of communication systems have been deployed and are available for use through which to effectuate such functions and services.

A communication system includes, at a minimum, a first communication station and a second communication station interconnected by way of a communication channel. The communication stations are positioned at the locations between which data is to be communicated. And, data to be communicated by one of the communication stations to the other is sent thereto by way of the communication channel. Some communication systems are multi-user communication systems that permit large numbers of users to communicate therethrough. Large numbers of users are able to effectuate different types of communication services through use of many different types of multi-user communication systems. As technological advancements permit, new types of multi-user, and other, communication systems have been developed and deployed. Some of the new types of communication systems permit more efficient effectuation of existing communication services. With the progression of additional technological advancements, new types of communication systems in which such technological advancements are deployed shall correspondingly likely be made available.

Advancements in digital communication techniques, and circuitry therefore used to implement such techniques, are amongst the technological advancements that have, for instance, been implemented in many new communication systems. The use of digital communication techniques provides several advantages. For instance, improved communication efficiencies are possible as a result of the use of digital communication techniques. When digital communication techniques are utilized, the data that is to be communicated is digitized, or otherwise converted, into digital form. Communication redundancies typically exhibited by the data, in analog form, are then removed from the data, once digitized.

By removing the communication redundancies, redundant data need not be communicated. And, as a result, the communication capacity of a digital communication system can be substantially increased relative to the communication capacity permitted in a corresponding analog communication system.

A radio communication system is an exemplary type of communication system. In a radio communication system, the communication channel that interconnects the communication stations is formed, at least in part, upon a radio link. That is to say, a communication path that extends between the communication stations of the radio communication system includes a part defined upon a radio link. The data that is communicated between the communication stations is communicated upon the communication channel, referred to as a radio channel, defined upon the radio link.

Various advantages are provided through use of a radio communication system. A radio communication system is, for example, generally deployed more economically than a wireline counterpart. The deployment costs associated with the installation of the network infrastructure of a radio communication system are generally less than the deployment costs associated with installation of the network infrastructure of a corresponding, wireline counterpart. So, for reasons associated with minimization of deployment costs, a radio communication system is sometimes preferred over a corresponding, wireline counterpart. Also, a radio communication system is implementable as a mobile communication system. A mobile communication system provides for communication mobility. And, communications in a mobile communication system are thereby possible, from and between, locations at which communications utilizing a conventional wireline communication system would be impractical. That is to say, communications with a communication station as it is moving is sometimes also possible in a mobile communication system.

A cellular communication system is a type of radio communication system that provides for voice and data communication services. In a cellular communication system, multiple access by significant numbers of users is permitted. Cellular communication systems are popularly utilized and have achieved high penetration levels in many areas. The network infrastructures of cellular communication systems have been deployed throughout significant geographical portions of populated areas of the world. And, successive generations of cellular communication systems have been deployed, sometimes overlayed upon common geographical areas. Successor-generation systems, intended to supplement and, eventually, to replace existing systems are undergoing deployment or are under development.

The first cellular systems that were commercially deployed generally utilize conventional analog communication techniques and use frequency-division, multiple-access communication schemes. These systems are sometimes referred to as being first-generation (1G) cellular communication systems. And, first-generation systems generally provide for circuit-switched, voice communications.

Systems introduced, subsequent to the deployment of first-generation systems, and that first utilized digital communication techniques, are referred to as being second-generation (2G) cellular communication systems. These systems generally provide for some data services. And, 2.5G (second-and-a-half generation) and 3G (third-generation) systems are currently undergoing deployment. These systems, generally, provide for more extensive data services. That is to say, these systems generally provide for communication services at higher data rates as well as services effectuable at multiple data rates. And, successor-generation systems are being developed. When deployed, these systems shall likely provide opportunity for even more extensive data services.

A cellular communication system, referred to as a GSM (Global System for Mobile communications) cellular communication system, is exemplary of a second-generation cellular communication system. The GSM system operates pursuant to the protocols and standards set forth in an operational specification promulgated by the ETSI (European Telecommunications Standards Institute). The GSM system defines a communication scheme that utilizes a combination of frequency division multiple access (FDMA) and time-division multiple-access (TDMA) communication schemes. Networks constructed to be operable pursuant to the GSM operating specification have been installed throughout many areas. Many users subscribe to service in a GSM system to communicate telephonically therethrough. Similarly, other cellular communication systems, operable pursuant to other operating specifications have also been constructed throughout many areas. And, many other users subscribe to service in such other systems. The mobile nodes are of physical dimensions that permit the subscribers to hand-carry the mobile nodes. Mobile nodes are typically constructed to mimic operation of conventional telephonic stations. That is, mobile nodes typically are operable both to originate and to terminate telephonic calls in manners that correspond, at least from the perspective of the user thereof, to the manners by which conventional, telephonic stations are utilized to originate and to terminate such calls.

Calls can be placed to, or originated at, the mobile nodes for termination at the mobile node. Signaling is generated with the mobile node during a call set-up procedure as part of the call placement. And, pursuant to the call set-up procedure, an alert, such as a ringing tone, is caused to be generated at the mobile node. The alert alerts the user of the mobile node of the call placed thereto. And, the user of the mobile node is able to accept the call responsive to the alert. The call is accepted in a manner analogous to the manner by which the user of a conventional wireline station takes the wireline station off-hook.

When a call is placed at the mobile node, the call is referred to as being originated at the mobile node. To originate the call, the user enters the dialing digits that identify the station, i.e., the called party, to which the call is intended to be placed, i.e., terminated. Again, the call is placed in a manner analogous to the manner by which the dialing digits associated with the called party are entered at a conventional wireline station. Call signaling procedures are performed to 'set-up' the call. Such call signaling procedures are generally transparent to the user.

In some areas, certain designated service centers are designated by shortened codes. That is to say, shortened dialing codes, herein sometimes referred to as short numbers or short dialing codes, identify the certain designated service centers. For instance, in the United States, some areas have 9-1-1, emergency service centers. And, the 9-1-1 code is sometimes referred to as an emergency number. A person placing a request, e.g., for emergency assistance, enters the 9-1-1 code at a telephonic station. The call is routed, as a result, to an appropriate 9-1-1 service center. The 9-1-1 service center includes facilities that assist in quick response to the request. In other areas, other codes are used to identify such a service center. For instance, in the United Kingdom, an emergency services center is accessed telephonically from a telephonic station through the entry of a 9-9-9 code.

Some other service centers are analogously also designated by short numbers. For instance, directory service centers are accessed telephonically in some areas of the United States by entry of a 4-1-1 code at a telephonic station. In some other areas, such as parts of the United Kingdom, a directory service center is accessed telephonically by entry of a 1-9-2 code. Similarly, operator assistance is accessed telephonically in some areas by entry of the digit '0' and, in some other areas, by entry of the short code 1-0-0.

Problems sometimes result when a mobile node is used through which to enter the short dialing codes. For instance, the mobile node might be positioned in an area at which a short code that designates a particular service center-type be of a first set, or sequence, of digits, and the mobile node might later be positioned in an area at which the short code that designates the particular service center-type be of a different set, or sequence, of digits. For example, the mobile node might initially be positioned in an area at which the short code associated with an emergency services center comprise the 9-1-1 digits. And, later the mobile node might be repositioned, to be located in an area at which the short code associated with the emergency service center comprises the 9-9-9 sequence of digits.

The home network associated with the mobile node, generally the network with which the user of the mobile node is familiar, therefore, might well use short codes that differ with the short codes that are used by the network in which the mobile node is subsequently positioned The short codes with which the user is familiar or those that are stored, such as for speed-dialing purposes, at the mobile node might well differ with the codes that are required to effectuate a call to the intended service center. If the short code associated with a service center that the user of the mobile node intends to call is entered at a location that utilizes a different short code to access the service center, the intended service center is not accessed.

A manner is needed, therefore, by which better to provide for placement of a call from a mobile node to a service center using a short code. That is to say, a manner is needed by which to take into account the mobility inherent of a mobile node so that a service center that is accessed by entry of a short code by a user of the mobile node remains accessible irrespective of the position of the mobile node when a call is placed to the service center.

It is in light of this background information related to communications in a radio communication system that the significant improvements of the present invention have evolved.

SUMMARY OF THE INVENTION

The present invention, accordingly, advantageously provides apparatus, and an associated method, by which to facilitate call placement by a user of a mobile node to a service center, such as an emergency dispatch center or a directory-service center, identifiable to a user of a mobile node by a short dialing code, such as a 9-1-1 or 9-9-9 short dialing code.

Through operation of an embodiment of the present invention, a manner is provided by which to broadcast, or otherwise deliver, short codes, used in a network with which the mobile node is registered, to the mobile node. Once delivered to the mobile node, the delivered short dialing codes are associated with short dialing codes normally used by the user to identify the service center.

The service center is contacted responsive to entry by the user of the mobile node or the short dialing code that the user associates with the service center. The same code is entered by the user irrespective of the location at which the mobile node is positioned when the call is initiated. If the short dialing code entered by the user differs with the short dialing code used at the location at which the call is placed, the entered dialing code is transposed, and the call is placed using the appropriate, i.e. transposed, short dialing code. The user of the mobile node need not learn the short dialing code used throughout different areas. The short dialing codes regularly utilized by the user continue to be used by the user, irrespective of the location of the mobile node, i.e., at which the mobile node is positioned.

If needed, the short dialing code, entered at the mobile node, is transposed. And an alternate, i.e., transposed, dialing code is substituted at the mobile node for the entered code. A call that is intended to be placed to a certain, designated service center is more likely to be successfully completed through operation of an embodiment of the present invention as the dialing code used in a particular area need not be known by, or entered by, the user to complete the call to an appropriate service center.

In one aspect of the present invention, network-part identifier codes are provided to a network-positioned code-delivery detector. The code-delivery detector is embodied at, or otherwise associated with, a particular network part of the network portion of a mobile communication system. The particular network part utilizes selected short dialing codes by which to identify service centers, such as an emergency service and dispatch center, a directory service center, and an operator assistance center. And, the network-part identifier codes that are provided to the code-delivery detector are of values corresponding to the selected short dialing codes used at the particular network part to identify the service centers. Once delivered thereto, the values are maintained at the detector, or a memory associated therewith.

In another aspect of the present invention, a broadcast scheduler is coupled to the code-delivery detector, thereby to be provided with values of the network-part identifier codes that are detected by the detector. The broadcast scheduler operates to schedule broadcast of the network-part identifier codes detected by the detector. The broadcast is scheduled throughout at least a portion, such as the entire portion, of a geographical area encompassed by the network part. The broadcast is scheduled to be repeated at selected intervals, such as at periodic intervals. The broadcast scheduler schedules, for instance, broadcast of the codes by selected ones, or all, of the base transceiver stations of the particular network part associated with the broadcast scheduler.

The network-positioned, code-delivery detector and the identifier-code broadcast scheduler are embodied, for instance, at a cell broadcast center that is coupled to a BSC (Base station controller) of the network part of the mobile communication system with which a mobile node registers. Once the scheduler creates the schedule of the broadcast, the schedule is provided to a base station controller that controls operation of the affected base transceiver stations from which the information is to be broadcast. The information is broadcast, for instance, upon a cell broadcast channel, such as a cell broadcast channel defined in a GSM/3GPP system (Global System for Mobile communications/Third Generation Partnership Project) operating specification.

In another aspect of the present invention, an application server maintains a database at which short dialing codes are maintained. The application server, or other functional entity, in one implementation, forms a portion of, is coupled to, or is otherwise associated with the network with which the mobile node registers. The application server is coupled, for instance to the CBC (Cell Broadcast Center) of a network part of the mobile communication system at which the mobile node is registered. In another implementation, the application forms a portion of, is coupled to, or is otherwise associated with another part of the network portion of the mobile communication system. The application server is, for instance, embodied at the home network of the mobile node. In this implementation, the database of the application server again forms a repository of dialing codes. The repository of dialing codes, in a further implementation, includes the dialing codes that are used or otherwise available for use at any location throughout the system in which the mobile node is potentially operable.

The database maintained at the application server includes, in one implementation, additional indicia associated with the short dialing codes maintained thereat. The additional indicia is formed, for instance, of mnemonics associated with the short dialing codes, in one or more languages. The mnemonics identify, for instance, the name associated with the short dialing codes. When provided in more than one language, subsequent selection of in which language the mnemonic associated with the short dialing code is permitted.

In another aspect of the present invention, the mobile node detects the broadcast of the short dialing codes that is scheduled by the identification code broadcast scheduler and caused to broadcast throughout a selected geographical area. When additional indicia is also broadcast together with values of the short dialing codes, detection of the additional indicia is also made by the mobile node. A code broadcast detector, for instance, is coupled to, or embodied at, a receive part of the mobile node to detect the reception at the mobile node of the broadcast information. In an implementation in which the information is broadcast upon a cell broadcast channel, the receive portion of the mobile node is caused to monitor, at least at selected intervals, the cell broadcast channel. When the information is broadcast on another channel, the receive portion, as appropriate, is caused to monitor such other channel.

In another aspect of the present invention, detected values of the short dialing codes, as well as any additional indicia detected at the mobile node, such as the mnemonics associated with the short dialing codes are provided to an indexer. The indexer indexes the short dialing codes used at the mobile node to identify one or more service centers together with the delivered short dialing codes broadcast to the mobile node and detected by the detector. The mnemonics, or any additional information associated with the short dialing code or its associated service center, are also indexed together, as needed. Once indexed together, a mapping between a mobile-node dialing code and its alternate dialing code is readily ascertainable.

When a user of the mobile node enters a short dialing code to place a call to a service center, the values of the digits of the entered dialing code are mapped to the values of the corresponding, dialing code broadcast to the mobile node. And, the values of the corresponding, downloaded dialing code are substituted for the entered dialing code. Once substituted, otherwise normal calling procedures are carried out to place the call to the service center. Because the entered dialing code is substituted with the downloaded dialing code, the call can be completed, i.e., terminated at, the appropriate service center. The call can be completed even though the user of the mobile node does not know the dialing code used in the network in which the call is placed. And, the user of the mobile node need not even be aware that the dialing code that is entered to place a call to a selected service center is not used in the area in which the user initiates a call. The procedure is, e.g., automated, the request for the alternate, dialing codes are delivered in manners wholly transparent to the user of the mobile node. Improved user acceptance of the mobile node is thereby facilitated as the user of the mobile node is better able to complete a call to a service center irrespective of the location at which the user, and the mobile node, is positioned when the call is initiated.

And, when the service center forms an emergency service center to which a request for emergency service is requested, substitution of the alternate dialing code for the entered dialing code better assures that an essential call, e.g., a call that requests emergency assistance, is completed and appropriate assistance is rendered.

The mobile node might be positioned in an area in which greater numbers of short dialing codes are available for use than the number of short dialing codes that are available in the home area in which the mobile node is normally operated. In such an area, the broadcast information that is broadcast to the mobile node includes the short dialing codes that are used in the area. In addition to the dialing codes that are indexed theretogether, one or more, additional, downloaded dialing codes are available for use at the mobile node. The additional, downloaded dialing codes are maintained at the mobile node, and indicia associated therewith are displayable upon a user display, e.g., to identify to the user the availability of use of the additional short dialing codes associated with the one or more additional service centers.

Mnemonic, or other indicia, associated with any of the short dialing codes is also displayable upon the user display to identify to the user of the mobile node the availability of the short codes for use by the user to initiate a call to an appropriate service center. Icons, e.g., or the like, are displayable upon the user display of the mobile node. And, mnemonics, in an appropriate language are also displayable upon the user display. A language preference is selectably input at the mobile node, or default is made to a preferred language. When the broadcast information includes mnemonic indicia in more than one language, the mnemonic in the preferred language is used by the mobile node. Mnemonics in other languages, for instance, are discarded or otherwise not used by the mobile node.

Thereby, a manner is provided by which alternate, short dialing codes are downloaded to a mobile node for use in a network in which the mobile node is registered. When a user of the mobile node enters, or causes entry of, a dialing code associated with a service center, the dialing code is transposed, and substituted with, an appropriate, alternate dialing code. A call placed to a service center associated with the short dialing code is placed even though the user of the mobile node uses a dialing code that otherwise would not result in completion of a call to the service center.

A mechanism is provided by which, when the wireless device first discovers a wireless, network, the wireless devices determines whether a broadcast channel for data is available. If such a channel is available, the wireless device then monitors the broadcast channel until a determination is made that short dialing codes are being broadcast upon the broadcast channel. Upon such determination, the values of the broadcast, short dialing codes are downloaded to the wireless device. And, once downloaded, the downloaded values are mapped to corresponding numbers that are permanently stored at the wireless device. The downloaded values are maintained at the wireless device while the wireless device remains in the area encompassed by the network part that uses such downloaded codes. When the wireless device is subsequently repositioned, the download of values of short dialing codes is again effectuated, and mapping is again performed, so that the downloaded values are current, i.e., appropriate for the network part with which the wireless device becomes associated.

In these and other aspects, therefore, apparatus, and an associated method, is provided for a radio communication system having a mobile node operable to communicate with a network part of a communication network. The radio communication system has at least a first service center to which a call, originated at the mobile node, is routable by way of the network part. Call placement by a user of the mobile node to a selected service center of the at least the first service center is facilitated. A network-positioned, code-delivery detector is adapted to receive a network-part identifier code that identifies at least the selected call center of the at least the first selected call center. The network-positioned code-delivery detector detects values of each network-part identifier code received thereat. An identifier-code broadcast scheduler is coupled to the network-positioned code-delivery detector to receive indications of the values detected thereat. The identifier-code broadcast scheduler schedules at least a selected broadcast of the values throughout at least a portion of an area encompassed by the network part.

In these and further aspects, apparatus, and an associated method, is also provided for a radio communication system having a mobile node operable to communicate with a network part of a communication network. The radio communication system has at least a first service center to which a call, originated at the mobile node is routable by way of the network part. Placement of the call to a selected service center of the at least the first service center is facilitated. A mobile node-positioned code-broadcast detector detects values of a broadcast to the mobile node of at least a first network-part identifier code that identifies the at least the first selected call center. An indexer is coupled to the mobile node-positioned code-broadcast detector. The indexer indexes values of the network-part identifier code detected by the mobile node-positioned code-broadcast detector together with values of at least a first mobile-node identifier code.

A more complete appreciation of the present invention and the scope thereof can be obtained from the accompanying drawings that are briefly summarized below, the following detailed description of the presently preferred embodiments of the invention, and the appended claims.

DETAILED DESCRIPTION

Figure 1:
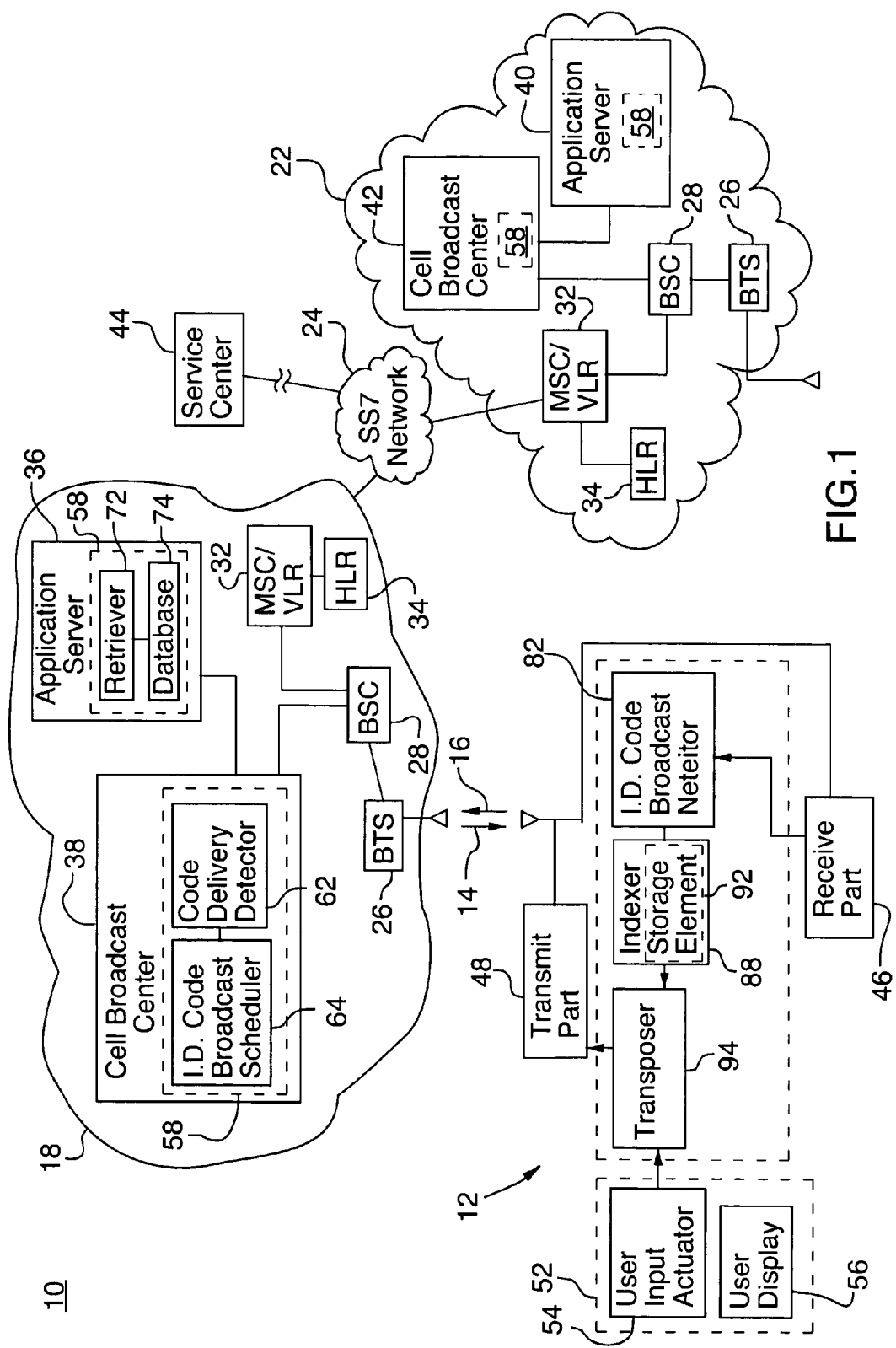
FIG. 1 illustrates a functional block diagram of a communication system in which an embodiment of the present invention is operable.

Referring first to FIG. 1, a mobile communication system, shown generally at 10, operates to provide for radio communications with mobile nodes. The mobile node 12 is representative of the mobile nodes that are operable in, and form part of, the communication system. The mobile communication system here forms a multi-user communication system that permits a plurality of concurrent communication sessions concurrently to be effectuable with a plurality of mobile nodes. While FIG. 1 illustrates only a single mobile node 12, in an actual implementation, the mobile communication system typically includes a large number of mobile nodes 12. And, the mobile nodes are concurrently operable pursuant to separate communication sessions through which to effectuate various communication services. Additional mobile nodes can be represented in the Figure, analogous to the representations of the mobile node 12, operable pursuant to additional point-to-point or point-to-multipoint communication services.

The communication system 10, in the exemplary implementation, forms a cellular communication system that conforms to an appropriate cellular operational specification. And, more particularly, the cellular communication system is here operable, generally, pursuant to the operational specification specifying the operational parameters of a proposed third generation (3G) GSM (Global System for Mobile communications) cellular communication system promulgated by the 3GPP (Third Generation Partnership Project). The following description shall describe exemplary operation of an embodiment of the present invention with respect to its implementation in a GSM/3GPP cellular communication system. Embodiments of the present invention can analogously be implemented in other types of mobile, as well as other radio, communication systems. Accordingly, it should be understood, that the exemplary operation of the various embodiments of the present invention described herein can analogously be described with respect to operation of an embodiment of the present invention implemented in any of such other types of communication systems.

The mobile communication system includes a fixed network. The mobile node communicates with the network by way of channels defined upon radio links that extend between the network and the mobile node. Data communicated by the network to the mobile node is sometimes referred to as being communicated upon a downlink, and data communicated by the mobile node to the network is sometimes referred to as being communicated upon an uplink. Here, the downlink is represented by the arrow 14 and the uplink is represented by the arrow 16. Downlink channels are defined upon the downlink, and uplink channels are defined upon the uplink. The downlink and the uplink channels in the exemplary GSM/3GPP system are defined in terms of combinations of frequencies and time slots. Both control data and traffic data are communicated upon various of the channels defined upon the downlink and uplink, respectively.

The network of the communication system illustrates two GSM network parts, a first GSM network part 18 and a second GSM network part 22. Additional network parts can analogously be shown. The network parts 18 and 22 are connected together, in conventional manner, by way of an SS7 signaling network 24. In other implementations, other types of bearer networks, such as an X.25 network, interconnect the GSM network parts. For instance, in another implementation, an X.25 network interconnects the network parts 18 and 22.

The network parts each include functional elements of the network infrastructure of a GSM network as set forth in the aforementioned, proposed operational specification. The network part 18, for instance, includes radio network elements, here shown to include a base transceiver station (BTS) 26 and a base station controller (BSC) 28 coupled thereto. The base transceiver station includes transmit and receive circuitry that operates to transceive data with the mobile node. And, the base station controller operates to control operation of groups of base transceiver stations of which the base transceiver station is representative. The base station controller, in turn, is coupled to a mobile switching center/visited location register 32. A home location register (HLR) 34 is functionally coupled to the mobile switching center/visited location register. An application server 36 is also associated with the GSM network part 18, here functionally coupled to the cell broadcast center. A cell broadcast center 38 is also associated with the network part 18.

The network part 22 includes corresponding elements. That is to say, the second network part also includes commonly-referenced elements of the radio network, namely a base transceiver station (BTS) 26 and a base station controller (BSC) 28. And, the second network part also includes a mobile switching center/visited location register (MSC/VLR) 32 and a home location register (HLR) 34. An application server, here designated at 40 is also embodied at the second network part, and a cell broadcast center 42 is further embodied at the second network part.

The SS7 network 24, or other appropriate network, forms a signaling network that provides for communication of signals and data between the separate GSM network parts 18 and 22. The SS7 network includes, in conventional manner, a switching node that forms a service transfer point (STP). Additional networks are connectable to the SS7 network. For instance, a public-switched, telephonic network (PSTN) or an integrated service digital network (ISDN) is connectable to the SS7 network.

A service center 44 is functionally coupled to the SS7 network. The service center is physically coupled to the SS7 network by any selected manner, such as by way of the aforementioned PSTN or ISDN networks. The service center 44 can alternately be coupled elsewhere to form part of the communication system 10 by way of another connection. The service center 44 is representative of any calling location identified by a coded sequence of digits. And, here, more particularly, the service center is representative of a calling location identified by a first code by the first network part 18 and identified by a second code by the second network part 22.

The service center 44 is representative of, for instance, an emergency dispatch center. In some areas, the emergency dispatch center is identified by the code 9-1-1 and, in some other areas, is identified by the code 9-9-9. Or, the service center is representative of, for instance, a directory service center. In some areas, the directory service center is identified by the code 4-1-1 and, in some other areas, the directory service center is identified by the code 1-9-2. Or, the service center is representative of an operator assistance center that, in some areas, is identified by the dialing code of '0' and, in some other areas by the dialing code of 1-0-0. And, the service center is also representative of any of various other service centers, accessible telephonically through entry of an appropriate dialing code.

The mobile node here includes a receive part 46 and a transmit part 48. The receive and transmit parts operate, in conventional manner, to transceive data pursuant to operation of the communication system. And, the mobile node also includes a user interface 52, including a user input actuator 54 and a user display 56.

A user might have need to communicate with the service center. And, communications with the service center are effectuable by way of the mobile node pursuant to operation of an embodiment of the present invention. During conventional operation of the mobile node, the user enters, or causes entry of, a code associated with the service center. A user initiates a call, for instance, through appropriate actuation of the input actuator 54. The input actuator, e.g., a telephonic keypad, is actuated by the user to input the dialing code associated with the designated service center. Or, a 'speed-dialing' procedure is used by which calling procedures are carried out, and a call connection is formed with the service center. This procedure is successfully carried out in conventional manner when the dialing code entered, or caused to be entered, by the user is the code used by the network part of the communication system through which the call is routed to the service center.

The service center is, however, identified by different codes in different areas, such as areas encompassed by different network parts, here the areas encompassed by the network parts 18 and 22. And, the call might not be completed using conventional calling procedures. Pursuant to an embodiment of the present invention, broadcast of the values of the short dialing codes used in a particular area encompassed by the network part 18 is caused by operation of apparatus 58 embodied at the cell broadcast center. Corresponding apparatus is embodied at the cell broadcast center 42.

By causing effectuation of the broadcast, call completion of a call to the service center is effectuated irrespective of the network part through which the call is placed to the service center. The elements of the apparatus are functionally represented. And, the functions provided by such elements can be implemented in any desired manner, such as, for instance, by algorithms executable by appropriate processing circuitry. Also, the functions provided by such elements are, in various implementations, carried out by other structure of the mobile node, such as at the transmit or receive parts, respectively, of the mobile node.

The apparatus includes a code delivery detector 62. The code delivery detector is coupled through the cell broadcast center to the base station controller to detect communication to the cell broadcast center of values of short dialing codes used at the network part 18 to identify service centers, such as the service center 44. The detector detects, here, all values of the short dialing codes communicated thereto. That is to say, if a plurality of different values, identifying the short dialing codes identifying a plurality of different service centers, is communicated to the cell broadcast center, the detector detects all of the values communicated to the broadcast center.

And, the apparatus 58 embodied at the cell broadcast center further include an identifier code broadcast scheduler 64, coupled to the code-delivery detector 62. Values of the short dialing codes detected by the detector are provided to the identification code broadcast scheduler. And, the broadcast scheduler schedules selected broadcast of the short dialing codes, together with other information, throughout at least selected areas encompassed by the network part 18. That is to say, the scheduler schedules broadcast of short dialing code information throughout one or more cells defined by base transceiver stations of the network part. And, in the exemplary implementation, the scheduler schedules broadcast of the information upon cell broadcast channels defined upon downlink channels used in different ones of the cells associated with the network part 18.

In the exemplary implementation, the broadcast scheduled by the scheduler is scheduled to be repeated at selected intervals. The selected intervals are selected, such as at regular, or periodic, intervals to facilitate detection thereof by mobile nodes, such as the mobile node 12. The broadcast schedule created by the broadcast scheduler is provided by way of the cell broadcast center and the base station controller, or controllers, as appropriate. Once delivered to the one or more base station controllers, the base station controllers cause the affected base transceiver stations to broadcast signals containing the values of the short dialing codes, together with other information, such as mnemonic information associated with the short dialing codes. The base transceiver stations are caused to broadcast the signals according to the schedule created by the broadcast scheduler.

The apparatus 58 embodied at other network parts, such as the network part 22, operate in analogous manners to detect values of short dialing codes used in the network parts at which the apparatus is embodied. And, broadcasts are scheduled of the values of the short dialing codes used at such other network parts in analogous fashion such that, when the resulting broadcasts are effectuated, mobile nodes positioned within areas encompassed by such other network parts are informed of the short dialing codes that are used in such other network parts. And, as a mobile node travels out of a geographical area encompassed by one network part and into an area encompassed by another network part, signals caused to be broadcast by the apparatus embodied at the other network part update the mobile node with the information of the dialing codes used in the area in which the mobile node is located. Thereby, the mobile node remains apprised of the values of the short dialing codes in the area in which the mobile node is positioned.

In the exemplary implementation, further apparatus of an embodiment of the present invention is also embodied at the network of the communication system. And, more particularly, in the exemplary implementation, further apparatus of an embodiment of the present invention is embodied at the application server 36 of the network part 18. The apparatus embodied at the application server 36 is here shown to include a retriever 72 and a database 74. And, analogously, further apparatus of an embodiment of the present invention is also embodied at the application server 40 of the network part 22.

The apparatus embodied at the application server here sources the information that is communicated to the cell broadcast center and detected at the detector 62 thereof. The database 74 maintains a listing of the short dialing codes used at the network part to identify service centers, such as the service center 42. The retriever 72 selectably accesses appropriate storage locations of the database to retrieve the values of the dialing codes. And, the retrieved values are communicated to the cell broadcast center.

In a further, or alternate, embodiment of the present invention, the short dialing code information communicated to the cell broadcast center originates at apparatus embodied at an application server positioned beyond the network part 18. The application server 40 of the second network part 22 is representative of such an external network-part application server at which the information is sourced. The network part 22 is, for instance, the home network of the mobile node 12.

The mobile node 12 also includes apparatus 58 of an embodiment of the present invention. Here, again, the elements of which the apparatus is formed are functionally represented. The functions carried out by the functional elements represented in the figure can be carried out in any desired manner, such as, for example, by algorithms executable by processing circuitry.

The apparatus embodied at the mobile node here includes a code broadcast detector 82 that is coupled to, or forms part of, the receive circuitry 46. The code broadcast detector operates to detect signals broadcast upon the cell broadcast channel that contain the values of the short dialing codes and other information associated with such short dialing codes.

Detections made by the detector are provided to an indexer 88. The indexer 88 also forms part of the apparatus 58 of an embodiment of the present invention. The indexer includes, or is coupled to, a storage element 92.

The indexer 88 operates to index values of the identification codes downloaded to the mobile node as a result of the broadcast of the short dialing codes upon the cell broadcast channel, and detected by the detector 82, together with permanently stored values of the identification codes that are associated by the mobile node, or the user thereof, with the service centers. By indexing the permanently stored values with the downloaded values, an association is formed between the separate values, permitting matching of the values, and use of the appropriate values, when a call is subsequently to be effectuated to a designated service center.

Once the values are indexed together, the values are stored at the storage element 92, available for subsequent retrieval when a call is to be placed at the mobile node to a designated service center. The values remain stored thereat, in the exemplary implementation, until the subsequent download of updated identification codes is provided to the mobile node. A subsequent download occurs, for instance, when the mobile node is subsequently repositioned at an area encompassed by another network part at which different values of short dialing codes are used. The download of the updated values occurs, in one implementation, as a result of determination at the mobile node that signals communicated upon a cell broadcast channel being monitored by the mobile node identify short codes that are of different values than the values of the short dialing codes stored at the mobile node. In another implementation, operations are initiated responsive to registration of the mobile node. That is to say, responsive to registration of the mobile node, the cell broadcast channel is monitored to detect values of the short dialing codes, and other information, broadcast thereon. Detected values are indexed and stored for subsequent usage, if necessary.

The apparatus embodied at the mobile node also includes a transposer 94 coupled to both the indexer and to the user input actuator 54 of the user interface 52. Thereby, when a call by a user of the mobile node to a service center is initiated, the transposer is made aware of the call placement. That is to say, when the user enters the shortened dialing code of a service center, the values of the shortened dialing code are provided to the transposer. Other input indicia entered by a user and associated with a call attempt to a service center is analogously provided to the transposer. And, responsive to the call initiation, the transposer operates to transpose the values input by way of the user actuator, or otherwise caused to be provided thereto pursuant to initiation of a call to the service center, together with corresponding downloaded values that identify the service center. When the values entered by the user to initiate the call to the service center differ with the values used in the network in which the mobile node is operable, the transposer substitutes the downloaded values, indexed by the indexer and stored at the storage element for the entered values. And, the transposer provides the substituted values to the transmit part 48. Normal call procedures are thereafter utilized to place the call to the service center. A call that otherwise would not successfully be placed to the designated service center is, through operation of the apparatus 58, able to be completed.

And, in at least one implementation, the functions carried out by the apparatus to cause the call to be placed using the dialing code used in the network in which the mobile node is registered, are performed automatically. A user need only initiate the call to the service center in the manner in which the user is accustomed. Operation of the apparatus 58 causes the appropriate, short dialing code to be substituted for the entered dialing code. And, the call is placed in normal manner thereafter.

Figure 2:
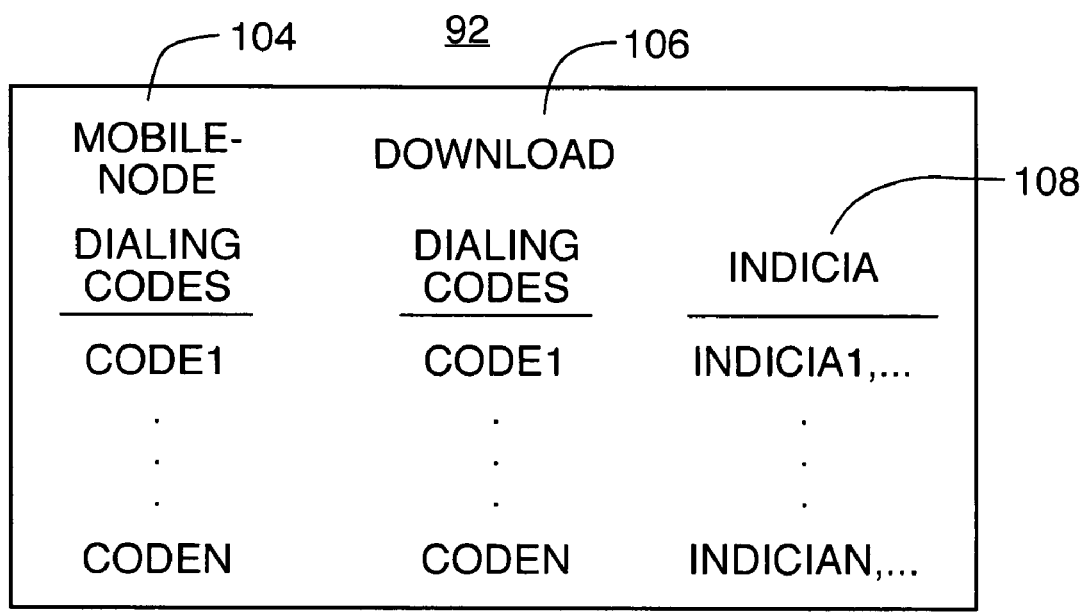
FIG. 2 illustrates a functional representation of values of indexed information stored at the mobile node pursuant to an embodiment of the present invention.

FIG. 2 illustrates a representation of the data stored at the storage element 92 pursuant to operation of an embodiment of the present invention. Data stored in the column 104 is representative of mobile-node dialing codes associated with service centers, and the data stored in the column 106 is representative of downloaded dialing codes that are associated with the corresponding service centers. And, data stored in the column 108 is representative of other indicia, such as mnemonics associated with the corresponding dialing codes. A network part to which the mobile node is registered might have greater, or fewer, service centers identified by shortened dialing codes.

Figure 3:
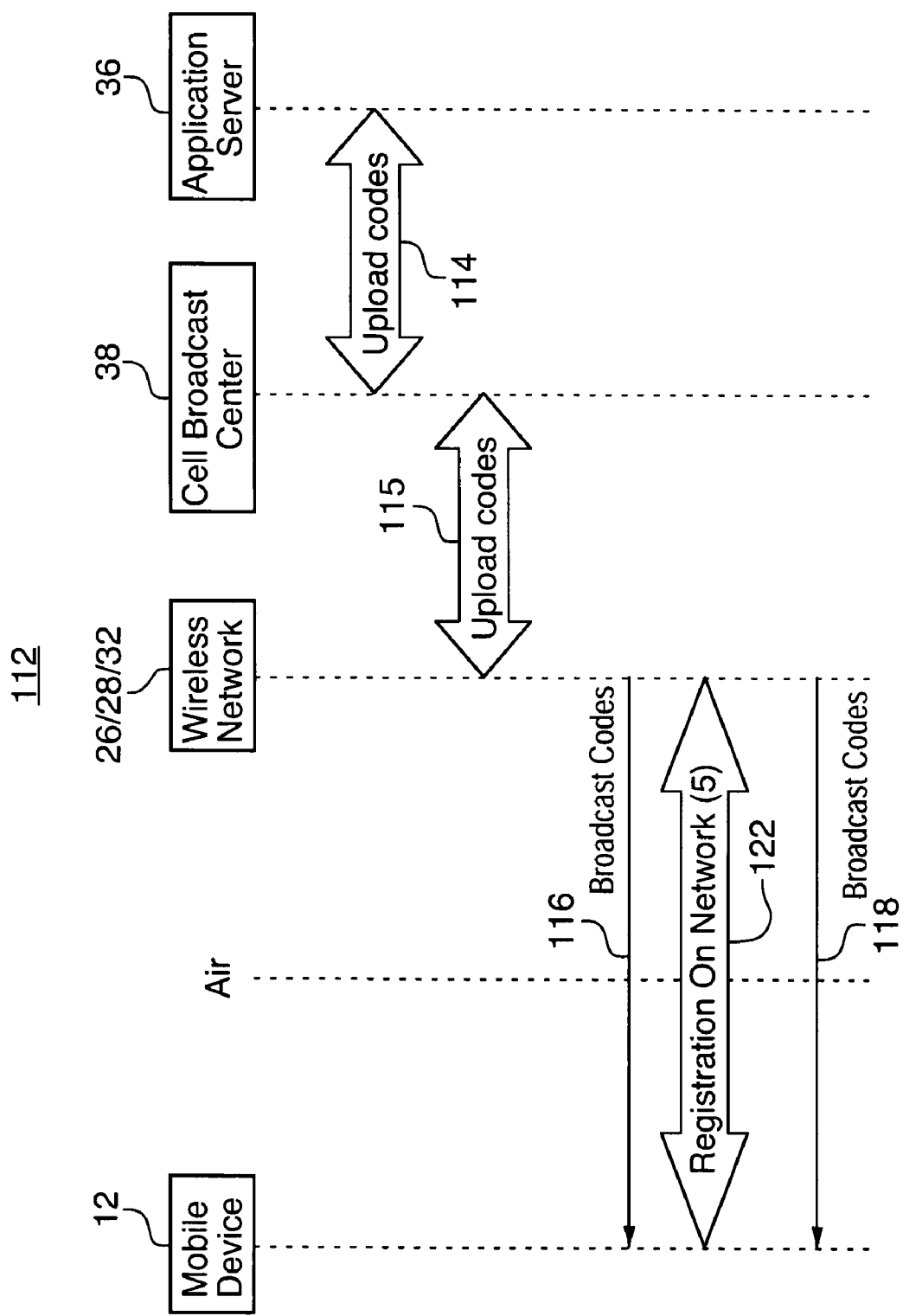
FIG. 3 illustrates a message sequence diagram representative of exemplary signaling generated during operation of the communication system shown in FIG. 1 pursuant to an embodiment of the present invention.

FIG. 3 illustrates a message sequence diagram, shown generally at 112, representative of signaling generated during exemplary operation of a communication system, such as the communication system 10, pursuant to operation of an embodiment of the present invention.

Operations are first performed at the application server 36 to retrieve short dialing codes, and other associated information, related to the short dialing codes used in a particular network part. Once retrieved, the values of the dialing codes, together with the associated information, are uploaded, as indicated by the segment 114 to the cell broadcast center 38. Upload of the values of the codes, and other information, is detected at the cell broadcast center, and broadcast schedules are created by which to broadcast the uploaded information. To effectuate the broadcast of the information, the detected codes, and other information, is provided to the wireless network elements, 26, 28, and 32, as indicated by the segment 115. And, the broadcast of the information is carried out therefrom, as indicated by the segments 116 and 118, on a cell broadcast channel. And, signaling pursuant to registration of the mobile node is represented by the segment 122. The values of the short dialing codes, and other information contained in the signals broadcast upon the cell broadcast channel, are detected by the mobile node, indexed together with mobile-node stored values, and stored thereat for subsequent use.

Figure 4:
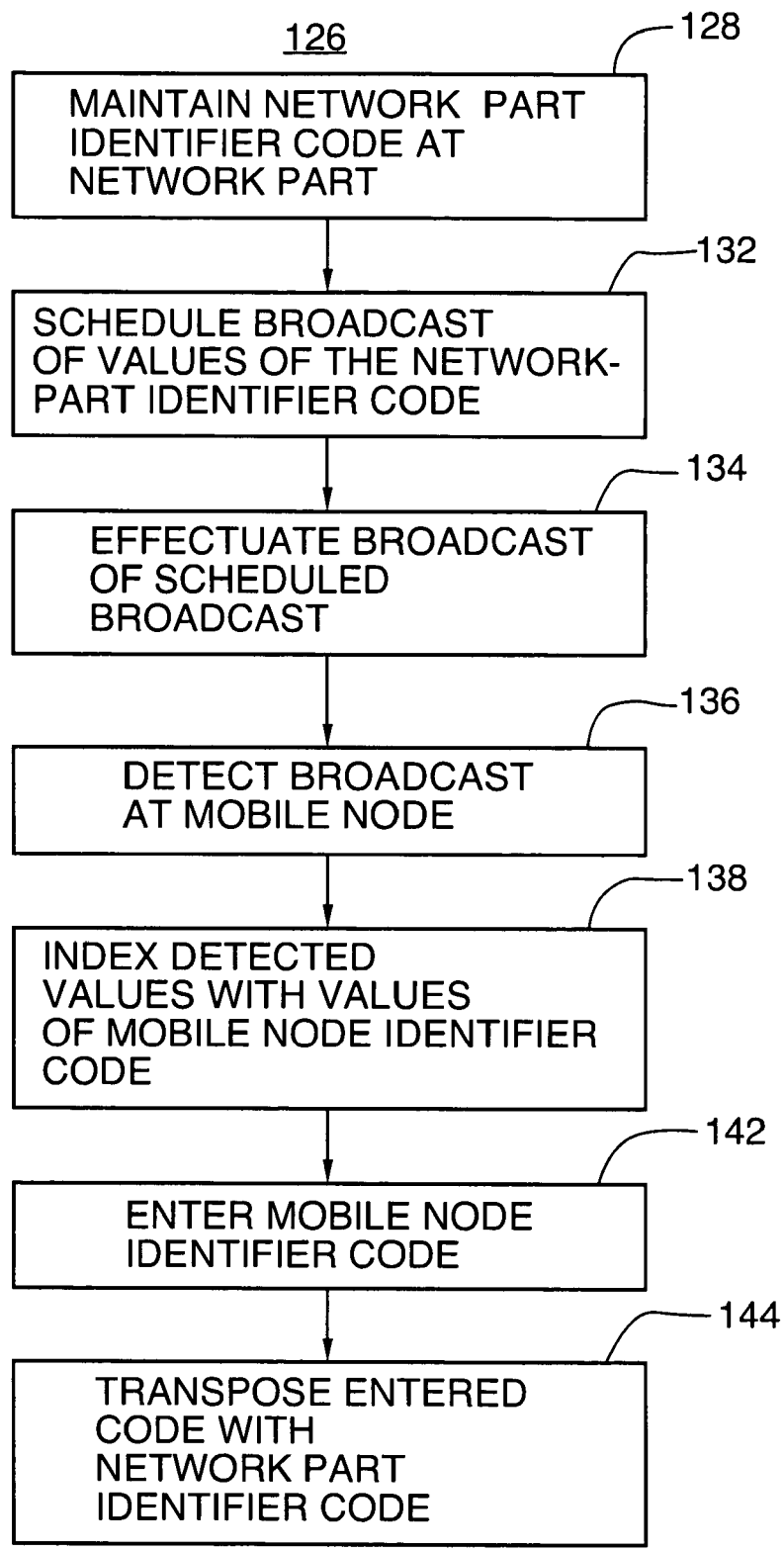
FIG. 4 illustrates a method flow diagram representative of the method of operation of an embodiment of the present invention.

FIG. 4 illustrates a method flow diagram, shown generally at 126, representative of the method of operation of an embodiment of the present invention. The method facilitates call-placement by a user of a mobile node of a call to a service center.

First, and as indicated by the block 128, values of at least a first network-part identifier code that identifies at least a selected call center of one or more call centers is maintained at the network part of a mobile communication system. Then, and as indicated by the block 132, at least a selected broadcast of the values is scheduled for at least a portion of an area encompassed by the network part. And, as indicated by the block 134, the scheduled broadcast is effectuated.

A mobile node detects, as indicated by the block 136, the broadcast of the values of the network-part identifier code. And, as indicated by the block 138, the detected values are indexed together with corresponding values of a mobile-node identifier code. Subsequently, when a mobile-node identifier code is entered, indicated by the block 142, the entered code is transposed, indicated by the block 144, with the corresponding network-part identifier code, and a call is placed to a service center identified by the network-part identifier code.

Thereby, when a call is placed by the mobile node to a service center, the network-part identifier code is used, thereby to permit the call to be completed to the designated service center.

The previous descriptions are of preferred examples for implementing the invention, and the scope of the invention should not necessarily be limited by this description. The scope of the present invention is defined by the following claims:

The invention claimed is:

1. Apparatus for a radio communication system operating pursuant to a GSM/3GPP (Global System for Mobile Communications/$3^{rd}$ Generation Partnership Project) operating specification having a mobile node operable to communicate with a network part of a communication network, and the radio communication system having a plurality of service centers to which a call, originated at the mobile node, is routable by way of the network part, said apparatus for facilitating placement of the call to a selected service center said apparatus comprising:
   an application server having a database wherein area-dependent short dialing codes for a plurality of service centers are stored and wherein a plurality of mnemonics that identify names associated with short dialing codes are stored, the application server storing each mnemonic for a short dialing code in a plurality of different languages;
   a network-positioned code-delivery detector adapted to receive from the application server, an area-dependent short dialing code for the selected service center and to receive from the application server, the mnemonic, in a plurality of different languages, that identifies the name associated with the short dialing code received from the application server, and
   an identifier-code broadcast scheduler coupled to said network-positioned code-delivery detector to receive the area-dependent short dialing code and the mnemonic in the plurality of different languages, said identifier-code broadcast scheduler for scheduling the broadcast of the area-dependent short dialing code and the received mnemonic in the plurality of different languages throughout areas encompassed by the network part, said broadcast being upon a cell broadcast channel associated with the network part for delivery to a mobile node, the area-dependent short dialing code and mnemonic in the plurality of different languages when delivered thereto, for being indexed together with permanently stored values maintained at the mobile node.

2. The apparatus of claim 1 wherein said network-positioned code-delivery detector is embodied at the network part through which the call to the selected service center is routable.

3. The apparatus of claim 2 wherein said identifier-code broadcast scheduler is further embodied at the network part through which the call to the selected service center is routable.

4. The apparatus of claim 1 further comprising:
   a computer-network-positioned retriever for retrieving the area-dependent short dialing code that identifies the selected service center and for providing values thereof to said network-positioned code-delivery detector.

5. The apparatus of claim 4 further comprising a data base element at which the values of the area-dependent short-dialing code are stored and wherein said retriever retrieves the area-dependent short dialing code by accessing the values stored at said data base element.

6. The apparatus of claim 1 wherein the network-part further comprises at least a first base transceiver station and a base station controller, and wherein said identifier-code broadcast scheduler provides indicia of the scheduling scheduled thereat to the base station controller to cause effectuation of the at least the selected broadcast of the values throughout the at least the portion of the area encompassed by the network part.

7. The apparatus of claim 6 wherein the at least the selected broadcast scheduled by said identifier-code broadcast scheduler is scheduled for broadcast at selected intervals.

8. The apparatus of claim 6 wherein the radio communication system operates pursuant to an operating specification that defines a cell broadcast channel and wherein the at least the selected broadcast scheduled by said scheduler is caused to be broadcast upon the cell broadcast channel.

9. The apparatus of claim 6, further comprising, at the mobile node:
   a mobile node-positioned code-broadcast detector for detecting values of the at least the selected broadcast caused to be broadcast responsive to the scheduling scheduled by said identifier-code broadcast scheduler.

10. The apparatus of claim 9 further comprising an indexer embodied at the mobile node and coupled to said mobile node-positioned cell-broadcast detector, said indexer for indexing values of the area-dependent short dialing code forming the network part identifier code detected by said mobile node-positioned code-broadcast detector together with values of at least a first mobile-node identifier code that forms the permanently stored values maintained at the mobile node.

11. The apparatus of claim 10 wherein the mobile node further comprises a user input actuator actuable by a user of the mobile node, wherein said apparatus further comprises a transposer coupled to the user actuator and to said indexer, said transposer operable responsive to actuation of the user input actuator with values of a mobile-node identifier for transposing the values into corresponding values of a network-part identifier code.

12. A method of communicating in a radio communication system operating pursuant to a GSM/3GPP (Global System for Mobile Communications/$3^{rd}$ Generation Partnership Project) operating specification having a mobile node operable to communicate with a network part of a communication network, and the radio communication system having at least a first service center to which a call, originated at the mobile node, is routable by way of the network part, said method for facilitating placement of the call to a selected service center of the at least the first service center, said method comprising:
   maintaining values, at the network-part, an area-dependent short dialing code that identifies the selected service center and storing in a plurality of different languages, a mnemonic that identifies a name associated with the area-dependent short dialing code for the selected service center; and
   scheduling the broadcast of the short dialing code and the broadcast of the mnemonic in the plurality of different languages, through-out areas encompassed by the network part for delivery to a mobile node, the broadcast values and the broadcast mnemonic in a plurality of different languages, when delivered to the mobile node being indexed together with permanently stored values maintained at the mobile node, the different languages of the mnemonic being displayable on a user display of the mobile node.

13. The method of claim 12 further comprising the operation of detecting, at the mobile node, the area-dependent short dialing code and mnemonics in different languages, broadcast during said operation of broadcasting.

14. The method of claim 13 further comprising the operation of: indexing, at the mobile node, the area-dependent short dialing code together with a corresponding first network-part identifier code, values of which are detected during said operation of detecting.

15. The method of claim 14 further comprising the operations of: entering, at the mobile node, values of a selected mobile-node identifier code of the at least the first mobile-node identifier code; and transposing the values into a corresponding network-part identifier code indexed together therewith.

16. Apparatus for a radio communication system operating pursuant to a GSM/3GPP (Global System for Mobile Communications/3$^{rd}$ Generation Partnership Project) operating specification having a mobile node operable to communicate with a network part of a communication network, and the radio communication system having at least a first service center to which a call, originated at the mobile node is routable by way of the network part, said apparatus for facilitating placement of the call to a selected service center of the at least the first service center, said apparatus comprising:

a mobile node-positioned code-broadcast detector for detecting area-dependent short dialing codes and a mnemonic in a plurality of different languages, the mnemonic identifying a name associated with the detected area-dependent short dialing code, the area-dependent short dialing code identifying the first selected service center, the mnemonics being displayable on a user display of the mobile node whereby the language of the mnemonics to be displayed can be selected; and an indexer coupled to said mobile node-positioned code-broadcast detector, said indexer for indexing values of the area-dependent short dialing code detected by said mobile node-positioned code-broadcast detector together with values of at least a first mobile-node identifier code.

* * * * *